Apr. 10, 1923.

G. A. FETHER 1,451,014

NUT AND BOLT LOCK

Filed Sept. 3, 1919

Witness
E. L. Broff

Inventor
GEORGE A. FETHER
By D. M. Vochau
Attorney

Patented Apr. 10, 1923.

1,451,014

UNITED STATES PATENT OFFICE.

GEORGE A. FETHER, OF EL DORADO, PENNSYLVANIA.

NUT AND BOLT LOCK.

Application filed September 3, 1919. Serial No. 321,374.

*To all whom it may concern:*

Be it known that I, GEORGE A. FETHER, citizen of the United States residing at El Dorado, in the county of Blair and State of Pennsylvania, have invented certain new and useful Improvements in Nut and Bolt Locks, of which the following is a specification.

This invention relates to an improvement in nut and bolt locks and has for its object a construction which may be applied to the contacting side of the bolt head as well as the contacting side of the nut, and in the latter application of the invention provides a distinctive locking action for preventing the retrograde movement of the nut on the bolt.

A further object is to provide a nut which will effectively perform its locking function by the simple act of being screwed onto the bolt while at the same time drawing the bolt through the parts to be connected in such a manner that its head portion will also be locked by a wedging action in the bolt hole.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Similar reference characters designate corresponding parts throughout the several figures of the drawings.

In carrying the invention into effect it is proposed to make the contacting or bearing surface of either the bolt head or the nut of a generally crowned or cambered formation which produces a relatively tapered bearing face that progressively increases in bearing area from the point of initial contact to the outer limits thereof as the nut or bolt is drawn into position. In order to render the gripping effect obtained by this formation more effective, it is proposed to break the crowned or cambered surface by a plurality of clearance notches or troughs which provide for the mashing out of the relatively small areas of metal left therebetween.

Figure 2:
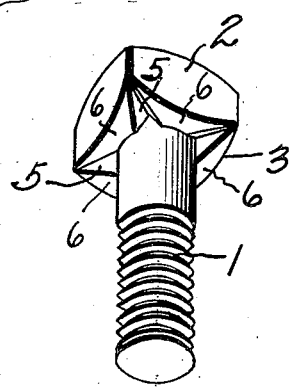
Figure 2 is a perspective view showing the under side of a bolt head constructed in accordance with the present invention.

Referring to the drawings it will be observed that the foregoing features of construction are shown in Figure 2 as applied to the bearing face of a bolt head. In said figure the usual threaded bolt shank 1 is provided with a head 2 whose bearing face 3 is cut away or cambered as indicated at 4 to provide a relatively tapered bearing rim which is broken or mutilated by a plurality of substantially V-shaped troughs or clearance notches 5 extending radially from the axis of the bolt shank 1 toward the corners of the bolt head. Although a rectangular bolt head 2 is shown it will of course be understood that the notches 5 may be utilized with equal efficiency in a bolt of the button-head type.

When the head of the bolt constructed as above described is applied to a fish plate or like part and the nut N is screwed onto the threaded shank 1 thereof, the bolt will be drawn into the hole, and under the pressure thus imposed the relatively small bearing areas 6 of the bolt head will be crowded into the bolt hole and thus tightly wedge the head of the bolt therein to prevent it from turning. A bolt constructed in accordance with the present invention is therefore especially adapted to withstand twisting or turning strains, and by the simple act of applying the nut has a firm locking engagement with the part to which it is applied.

Figure 3:
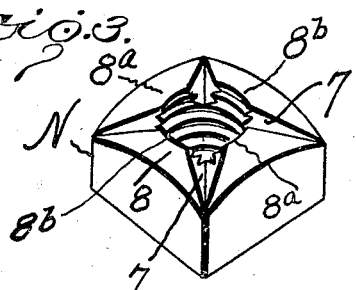
Figure 3 is a perspective view of a nut embodying my improved features of construction.

When the features of the invention heretofore set forth are embodied in a standard nut an especially advantageous and practical nut locking construction may be provided since the execution of the invention permits of a plurality of cambered bearing sections being provided on the nut, certain of which have a greater projection from the body of the nut than others, so as to provide a plurality of deformable bearing projections which will grip the threads of the bolt tightly as the nut is screwed into position and thus provide an effective lock. As shown in Figure 3 the bearing face of the nut N may be rounded off or cut away from the center toward the sides and provided with a plurality of clearance notches 7 extending radially from the axis of the nut toward the corners thereof and progressively increasing in width from the said corners toward the threaded opening of the nut, to thereby provide a plurality of cambered bearing projections 8, certain of which may be further cut away or otherwise formed to provide projections spaced a greater distance from the body of the nut than others. This construction may be accomplished by having the bearing projections 8 in stepped order, and this stepping may be a regular progressive stepping, or an alternate stepping as shown in the drawing, that is a stepping wherein the two highest projections $8^a$ may be paired in diametrically opposite relation, and the two lower projections $8^b$ also paired in diametrically opposite relation, so that each projection will have a stepped relation to the bearing projection immediately preceding the same.

Figure 1:
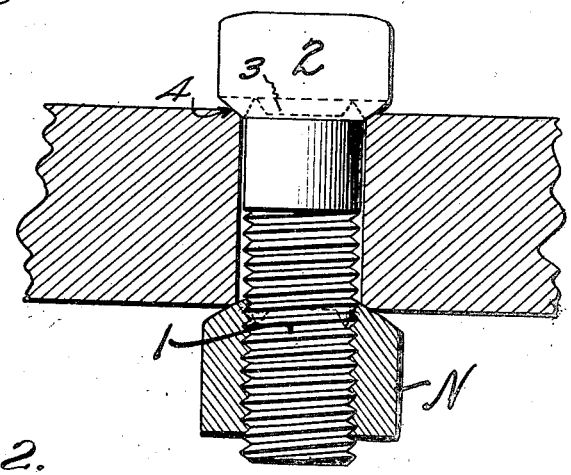
Figure 1 is a sectional view showing the application of the invention.
Figure 4:
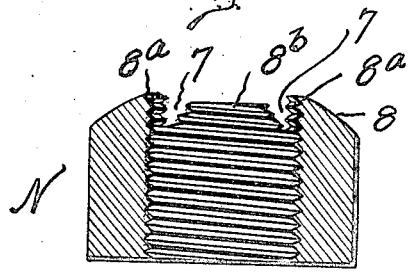
Figures 4 and 5 are cross sectional views of the nut taken at right angles to each other.
Figure 5:
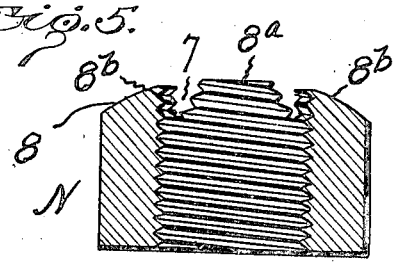

The arrangement described is clearly shown in Figures 4 and 5 of the drawings, and when a nut having the features therein shown is placed on the end of the bolt as shown in Figure 1, certain of its bearing projections will have an initial contact with the abutment surface, and by reason of their deformable characteristic due to the clearance notches 7, the highest bearing projections will be mashed down onto the thread of the bolt, and upon the nut being further screwed toward the abutment the other and lower bearing projections will come into play to further grip the threads of the bolt. By reason of the stepping of the bearing projections, it will be apparent that when the nut is screwed home on the bolt, the metal of the nut will be forced to crowd into the flights of the bolt threads and exert a positive frictional gripping effect on both sides of the thread, thus tightly wedging the nut onto the bolt by reason of the metal being crowded into and between the threads and also into the bolt hole in the vicinity of the nut.

The novel arrangement proposed by the present invention therefore provides in effect a plurality of deformable gripping tongues, whose initial thread engaging parts are located at different levels, whereby the initial thread gripping edges of adjacent projections will engage or embrace both sides of the same thread, thus materially enhancing the gripping action of the nut, when the same is screwed onto the bolt.

From the foregoing it will be apparent that the present invention provides a simple and practical nut lock and also an efficient bolt lock which becomes automatically effective upon the application of the nut and its being screwed into position.

I claim:

1. A lock nut for threaded bolts having a bearing face provided with a plurality of stepped bearing projections for progressively engaging directly with the part receiving the bolt.

2. A lock nut for threaded bolts having a bearing face provided with a plurality of stepped bearing projections, the deformable ends of which are adapted to engage on opposite sides of the bolt thread and successively engage the abutment which receives the bolt.

In testimony whereof I hereunto affix my signature in the presence of two witnesses.

GEORGE A. FETHER

Witnesses:
T. W. MOORE,
ADAM LEAKE.